(12) United States Patent
Borghetti et al.

(10) Patent No.: US 10,321,539 B1
(45) Date of Patent: Jun. 11, 2019

(54) INPUT PROTECTION CIRCUIT

(71) Applicant: Infineon Technologies AG, Neubiberg (DE)

(72) Inventors: Fausto Borghetti, Sant'Ambrogiodi Valpolicella (IT); Fabio Fragiacomo, Montegrotto Terme (IT); Davide Ghedin, Fiesso d'artico (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/980,569

(22) Filed: May 15, 2018

(51) Int. Cl.
| | |
|---|---|
| *G05F 1/00* | (2006.01) |
| *H05B 41/14* | (2006.01) |
| *H05B 33/08* | (2006.01) |
| *H02J 7/00* | (2006.01) |

(52) U.S. Cl.
CPC .......... *H05B 33/089* (2013.01); *H02J 7/0029* (2013.01); *H02J 7/0063* (2013.01); *H05B 33/0821* (2013.01); *H02J 2007/0067* (2013.01)

(58) Field of Classification Search
CPC .... H05B 41/34; H05B 33/0803; H05B 39/09; H05B 41/28; H05B 33/0809; H05B 41/295; H05B 41/2827; H05B 41/3925; H05B 33/0815; H05B 41/3927; H05B 41/3921; H05B 41/2828; H05B 37/029; H05B 37/0254; H05B 37/02; H05B 33/0818; Y02B 20/202
See application file for complete search history.

(56) References Cited

U.S. PATENT DOCUMENTS

| | | | | |
|---|---|---|---|---|
| 7,466,082 | B1 * | 12/2008 | Snyder ............... | H05B 33/0818 315/200 A |
| 2005/0218831 | A1 * | 10/2005 | Hague ................ | H05B 41/2851 315/225 |
| 2017/0231045 | A1 * | 8/2017 | Hu ...................... | H05B 33/0845 |

OTHER PUBLICATIONS

Infineon® LITIX™ Power, H-Bridge DC/DC Controller, TLD5190QV Data Sheet, Infineon.com, Rev. 1, May 20, 2016, 58 pp.

* cited by examiner

*Primary Examiner* — Minh D A
(74) *Attorney, Agent, or Firm* — Shumaker & Sieffert, P.A.

(57) ABSTRACT

In an example, a circuit includes one or more switches, wherein the circuit is configured to receive a battery voltage from a battery, deliver an input voltage to a controller, deliver an output voltage, and receive signals from the controller. The signals may activate the one or more switches and deactivate the one or more switches and activating the one or more switches and deactivating the one or more switches may control the input voltage to the controller.

20 Claims, 6 Drawing Sheets

INPUT PROTECTION CIRCUIT

TECHNICAL FIELD

This disclosure relates to electrical systems configured for input protection.

BACKGROUND

Input protection circuits may regulate parameters (e.g., amplitude and polarity) of a voltage output to a load. For example, a load including electronic circuit components may operate within a range of input voltage values, and an input protection circuit may regulate the input voltage to remain within the range of input voltage values. Additionally, input protection circuits may regulate parameters of a current supplied to the load.

SUMMARY

This disclosure describes techniques for an input protection circuit including a set of switches controlled by a controller. The circuit may be powered by a battery voltage of a battery, and the circuit may deliver an output voltage to a load. In addition, the circuit may provide an input voltage to a controller, wherein the controller may accept a threshold input voltage to operate. Consequently, if the battery voltage drops below the threshold input voltage, the circuit may increase the input voltage to the controller.

In one example, a circuit includes one or more switches, wherein the circuit is configured to receive a battery voltage from a battery, deliver an input voltage to a controller, deliver an output voltage, and receive signals from the controller, wherein the signals activate the one or more switches and deactivate the one or more switches, and wherein activating the one or more switches and deactivating the one or more switches controls the input voltage to the controller.

In another example, a system includes a circuit including one or more switches and a battery configured to deliver a battery voltage to power the circuit. The system further includes a load configured to be powered by an output voltage delivered by the circuit and a controller configured to produce signals activating the one or more switches and deactivating the one or more switches, wherein the circuit is configured to provide an input voltage to the controller, and wherein activating the one or more switches and deactivating the one or more switches controls the input voltage to the controller.

In another example, a method includes receiving, by a circuit including one or more switches, a battery voltage from a battery, delivering, by the circuit, an output voltage to a load, and delivering, by the circuit, an input voltage to a controller configured to activate the one or more switches and deactivate the one or more switches. The method further includes determining, by the controller, a voltage value of the battery voltage, and changing, with the circuit, the input voltage to the controller based on the voltage value of the battery voltage.

The details of one or more examples are set forth in the accompanying drawings and the description below. Other features, objects, and advantages will be apparent from the description and drawings, and from the claims.

DETAILED DESCRIPTION

Figure 1:
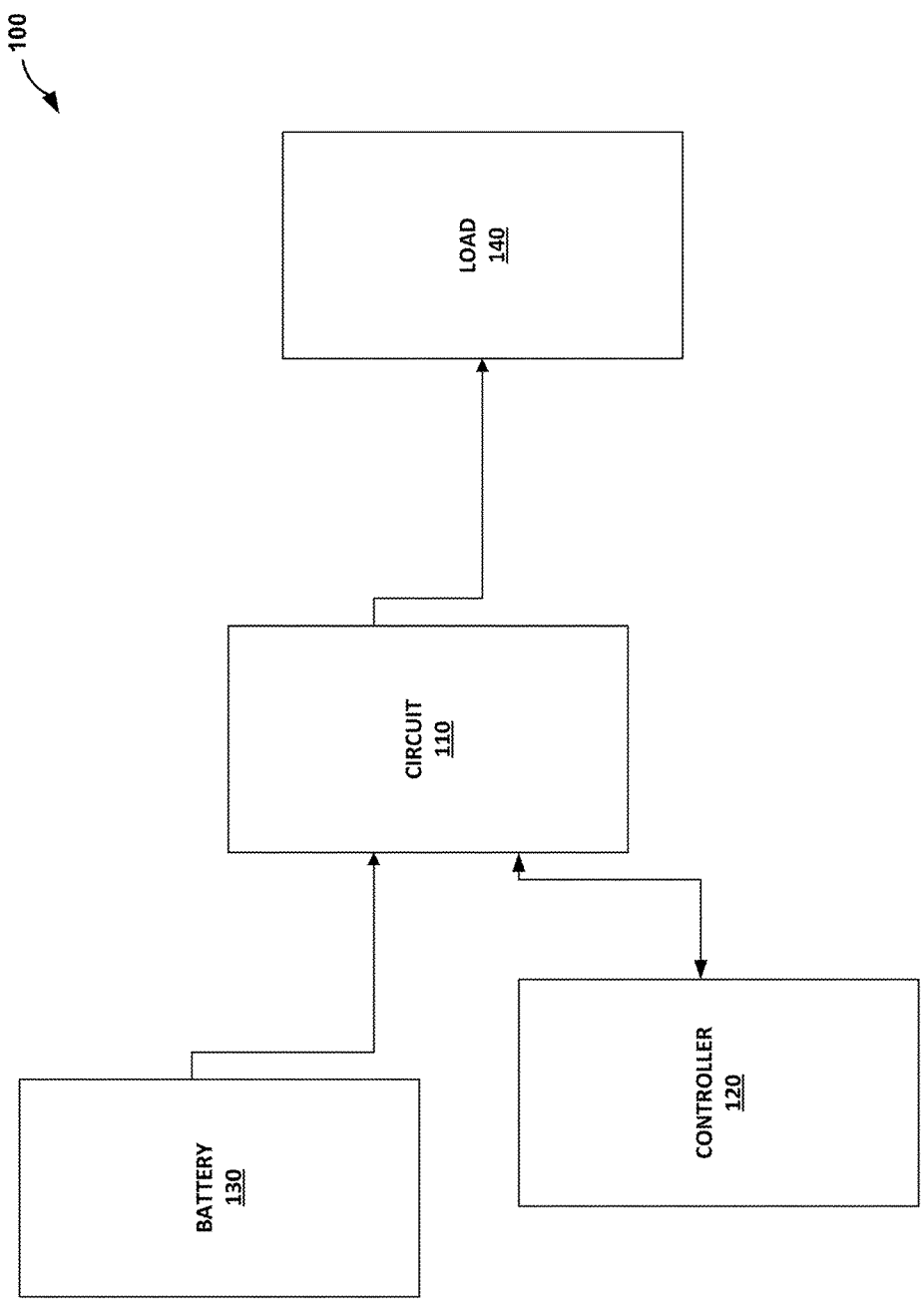
FIG. 1 is a conceptual block diagram illustrating a system for providing an input voltage to a controller, in accordance with some examples of this disclosure.

In various automotive applications, a battery may power a starter motor. For example, the starter motor may be configured to rotate an internal combustion engine, initiating the engine's operation from a resting state. Furthermore, the battery may power a load, wherein the load may include one or more light-emitting diodes (LEDs) among other components. Shortly after applying voltage to the starter motor, a battery voltage value delivered to the load may drop precipitously from a steady-state battery voltage value to a minimum battery voltage value. The battery may output the minimum battery voltage value for a window of time before returning to the steady-state battery voltage value. Even though the voltage output of the battery may decrease greatly, the controller may require a threshold input voltage to operate. Therefore, during the window of time in which the battery is outputting the minimum battery voltage value, the input voltage to the controller is increased such that the input voltage to the controller remains above the threshold input voltage. Increasing the input voltage to the controller can help to ensure that the circuit works properly at low temperature, and may help ensure that the starter motor is able to operate during a so-called cold crank.

In one example, the voltage drop from the steady-state battery voltage to the minimum battery voltage may increase as the temperature of the battery decreases (e.g., the minimum battery voltage decreases as the temperature decreases). For example, if the temperature of the battery drops below a threshold temperature, such as 0° Celsius, the minimum battery voltage delivered to the circuit may drop below 3 Volts after the battery powers the starter motor. Furthermore, a length of the window of time in which the battery outputs the minimum battery voltage may increase as the temperature of the battery decreases. Hence, a performance of the battery may degrade as the temperature of the battery decreases. Techniques and devices of this disclosure may improve the performance of the battery, the controller, and the load while the battery is powering the starter motor during cold temperatures.

A circuit may regulate the amount of current and voltage delivered to the load by the battery. In one example, the circuit includes a buck converter. A buck converter is a DC-to-DC power converter that decreases the voltage delivered to the load, and increases the current delivered to the load. The steady-state battery voltage output may be approximately 12 Volts, a standard voltage output of an automotive battery. As such, the buck converter circuit may decrease the voltage delivered to the load from the steady-state battery voltage output of 12 Volts. For example, the circuit including the buck converter may deliver an output voltage having a magnitude of approximately 5 Volts. In some examples, electrical circuit components of the load may be damaged if the voltage delivered to the load exceeds an output threshold voltage. Therefore, the buck converter may protect the load from high voltages. In another example, the circuit includes a boost converter. Contrary to the buck converter, the boost converter increases the voltage delivered to the load, and decreases the current delivered to the load. Furthermore, in another example, the circuit includes a buck-boost converter, enabling the circuit to both increase and decrease the voltage and the current delivered to the load.

In the examples of this disclosure, the circuit include charge pumps configured to increase the input voltage to the controller. The circuit may be configured to increase the input voltage to the controller while the circuit is bucking the output voltage to the load, and while the circuit is boosting the output voltage to the load. Charge pumps are DC-to-DC power converters including capacitors configured to raise or lower voltage. The charge pumps of the circuit may be regulated by a network of semiconductor switches, and the semiconductor switches may be controlled by the controller. As such, one or more techniques described herein may permit the controller to operate while the output voltage of the battery is lower than the threshold input voltage required to power the controller.

FIG. 1 is a conceptual block diagram illustrating a system 100 for providing an input voltage to a controller, in accordance with some examples of this disclosure. As illustrated in the example of FIG. 1, system 100 may include circuit 110, controller 120, battery 130, and load 140.

Circuit 110 may comprise circuit elements including resistors, capacitors, inductors, diodes, semiconductor switches, and other semiconductor elements. Battery 130 may supply a battery voltage, powering circuit 110. Furthermore, circuit 110 may provide an input voltage to controller 120 and an output voltage to load 140. In one example, circuit 110 includes a DC-to-DC power converter configured to regulate a current and a voltage delivered to load 140, such as a switched-mode power supply (SMPS). An SMPS uses one or more switches, often semiconductor switches, to convert electrical power. In one example, the SMPS includes a buck converter. A buck converter of circuit 110 may include an inductor, a switch, and a diode collectively configured to decrease a magnitude of the output voltage delivered to load 140 from a magnitude of the battery voltage supplied to circuit 110 by battery 130. Furthermore, the buck converter is configured to increase a magnitude of a current delivered to load 140 in comparison to a magnitude of a current delivered to circuit 110 by battery 130. In another example, the SMPS of circuit 110 includes a boost converter. In this example, the boost converter is configured to increase the magnitude of the output voltage delivered to load 140 by circuit 110 and decrease the magnitude of the current delivered to load 140 by circuit 110.

In one example of this disclosure, circuit 110 may include a buck-boost converter. A buck-boost converter, like a buck converter and a boost converter, is an SMPS. For instance, a buck-boost converter is configured to regulate the output voltage delivered to load 140 using at least two operational modes including a buck mode and a boost mode. Controller 120 may control semiconductor switches of the buck-boost converter to alternate the mode of the buck-boost converter (e.g., change the operation mode of the buck-boost converter from buck mode to boost mode and vice versa). In one example, controller 120 is configured to measure a magnitude of the battery voltage delivered by battery 130. In response to measuring the battery voltage, controller 120 sets the semiconductor switches to control the output voltage delivered to load 140. In the example illustrated in FIG. 1, the semiconductor switches of circuit 110 may include transistors, diodes, or other semiconductor elements.

Additionally, circuit 110 may include charge pumps configured to increase the input voltage delivered to controller 120. Charge pumps are DC-to-DC power converters including capacitors configured to raise or lower an output voltage of a charge pump circuit. In the example illustrated in FIG. 1, at least one charge pump of circuit 110 is configured to increase the input voltage to controller 120 delivered by circuit 110. In one example, the at least one charge pump of circuit 110 possesses an efficiency value greater than 90%. The efficiency value defines the ratio of the useful power output to the total power input of an electrical component, and the efficiency value of the electrical component measures an amount of power lost within the electrical component during operation of a circuit including the electrical component.

Controller 120 may include any one or more of a microprocessor, a microcontroller, a digital signal processor (DSP), an application specific integrated circuit (ASIC), a field-programmable gate array (FPGA), discrete logic circuitry, or any other processing circuitry configured to provide the functions attributed to controller 120 herein. Controller 120 may be embodied as firmware, hardware, software or any combination thereof. Furthermore, controller 120 may include a DC-to-DC controller configured to control a load. In one example, controller 120 includes a metal-oxide-semiconductor field-effect transistor (MOSFET) DC-to-DC converter including an H-bridge circuit including four MOSFET switches. H-bridge circuits are configured to switch the polarity of a voltage applied to a load (e.g., change a positive voltage to a negative voltage, and vice versa). In this example, controller 120 may be configured to deliver an output voltage magnitude approximately equivalent to the magnitude of the input voltage delivered to controller 120 by circuit 110. In one example, controller 120 may regulate a plurality of light-emitting diodes (LEDs) of load 140. Controller 120 may regulate the plurality of LEDs by controlling at least one of current and voltage delivered to the plurality of LEDs. In yet another example, controller 120 may regulate at least one additional microcontroller.

Furthermore, controller 120 may be configured to control transistors of circuit 110 in order to regulate the input voltage and an input current delivered to controller 120 by circuit 110. For example, controller 120 may deliver a control signal to a control terminal of a transistor of circuit 110 to regulate the flow of electricity between the load terminals of the transistor. The control signals may apply a voltage to the control terminal of the transistor, thus activating (e.g., "turning on") the transistor. Controller 120 may regulate the amount of time that the transistor is activated. For instance, controller 120 may activate the transistor at a first time and deactivate (e.g., "turn off") the transistor at a second time. Controller 120 may control the amount of time separating the first time and the second time. Controller 120 may deliver precise signals to the control terminal of the transistor, accurately regulating the amount of time that the transistor is activated.

Battery 130 may include a plurality of lead-acid cells arranged in series. In other examples, battery 130 may include lithium-ion, nickel metal hydride, or other types of materials. In one example, battery 130 includes six lead-acid cells arranged in series, and battery 130 defines a voltage of 12V. Furthermore, battery 130 defines a first terminal and a second terminal. A current flowing from the first terminal may supply power to circuit 110, controller 120, and load 140.

In one example, a starter motor is powered by battery 130, the starter motor configured to rotate an internal combustion engine. The starter motor may include a brushless direct current (BLDC) electric motor, a brushed direct current (DC) motor, an alternating current (AC) induction motor, or another type of electric motor. In some examples, the starter motor may require a large current from battery 130. In one example, a maximum current required by the starter motor may be greater than 300 amperes and less than 1000 amperes. In another example, the maximum current required by the starter motor is greater than 1000 Amperes. Internal combustion engines are configured to operate automobiles including but not limited to cars, trucks, and motorcycles. Powered by combustion of a fuel such as gasoline, pistons of an internal combustion engine may turn a crankshaft, and the crankshaft may be configured to rotate one or more wheels. Even though an internal combustion engine is a mechanical device, in many cases, the internal combustion engine may require assistance to begin operating under its own power. For example, an electric starter motor, powered by battery 130, may rotate, i.e., "crank," the internal combustion engine to start the operation of the internal combustion engine.

After the starter motor begins cranking the internal combustion engine (e.g., the starter motor begins drawing a current from battery 130), a magnitude of the battery voltage delivered to circuit 110 by battery 130 may drop precipitously. For example, battery 130 may have a steady-state voltage output of 12 Volts. However, immediately after battery 130 powers the starter motor, the magnitude of the battery voltage may drop from 12 Volts to less than 4.5 Volts. In one example, cold temperatures, such as temperatures below 0° Celsius, cause the battery voltage drop to be greater than a battery voltage drop occurring during warmer temperatures. Use of the starter motor during cold temperatures is known as a "cold crank." For instance, the battery voltage may drop from 12 Volts to approximately 3 Volts in cold temperatures. However, in one example, controller 120 requires a threshold input voltage of 4.5 Volts to operate. Consequently, to maintain the threshold input voltage to controller 120 during a cold crank, circuit 110 is configured to increase the input voltage to controller 120 to greater than the threshold input voltage. In one example, circuit 110 is configured to increase the input voltage to controller 120 to greater than the threshold input voltage if the battery voltage delivered by battery 130 is greater than 2 Volts.

In one example, circuit 110, including one or more charge pumps, may be configured to increase the input voltage to controller 120 while circuit 110 is delivering the output voltage to load 140. In one example, controller 120 activates a transistor of circuit 110, charging a capacitor of circuit 110 from the output voltage delivered to load 140. Subsequently, controller 120 turns the transistor off, and an inductor of circuit 110 delivers a current to load 140, thus increasing (e.g., "boosting") a magnitude of an output voltage delivered to load 140. After the transistor turns off, the capacitor is configured to increase a magnitude of the input voltage delivered to controller 120. In another example, circuit 110 is configured to increase the magnitude of the input voltage delivered to controller 120 while circuit 110 is decreasing (e.g., "bucking") the output delivered to load 140. Controller 120 turns a transistor of circuit 110 on, and current passes through an inductor of circuit 110 to load 140. Subsequently, controller 120 turns the transistor off, and an excess current emitted by the inductor charges a capacitor. Subsequently, controller turns the transistor on, and the capacitor increases the magnitude of the input voltage to controller 120.

In another example, battery 130 charges a capacitor of circuit 110 after controller 120 activates a transistor of circuit 110. After controller 120 deactivates the transistor, an inductor of circuit 110 emits an excess current to load 140, and the capacitor increases a magnitude of the input voltage delivered to circuit 120. In another example, controller 120 deactivates a transistor of circuit 110, and battery 130 charges a capacitor of circuit 110. Subsequently, controller 120 activates the transistor, and the capacitor increases the input voltage to controller 120.

Load 140 may include a collection of circuit components such as resistors, inductors, capacitors, diodes such as light-emitting diodes (LEDs), and other semiconductor elements. LEDs may refer to any suitable semiconductor light source. In some examples, an LED may include a p-n junction configured to emit light when activated. In an exemplary application, load 140 may be included in a headlight assembly for automotive applications. For instance, load 140 may be a matrix of light-emitting diodes to light a road ahead of a vehicle. As used herein, a vehicle may refer to motorcycles, trucks, boats, golf carts, snowmobiles, heavy machines, or any type of vehicle that uses directional lighting.

Figure 2:
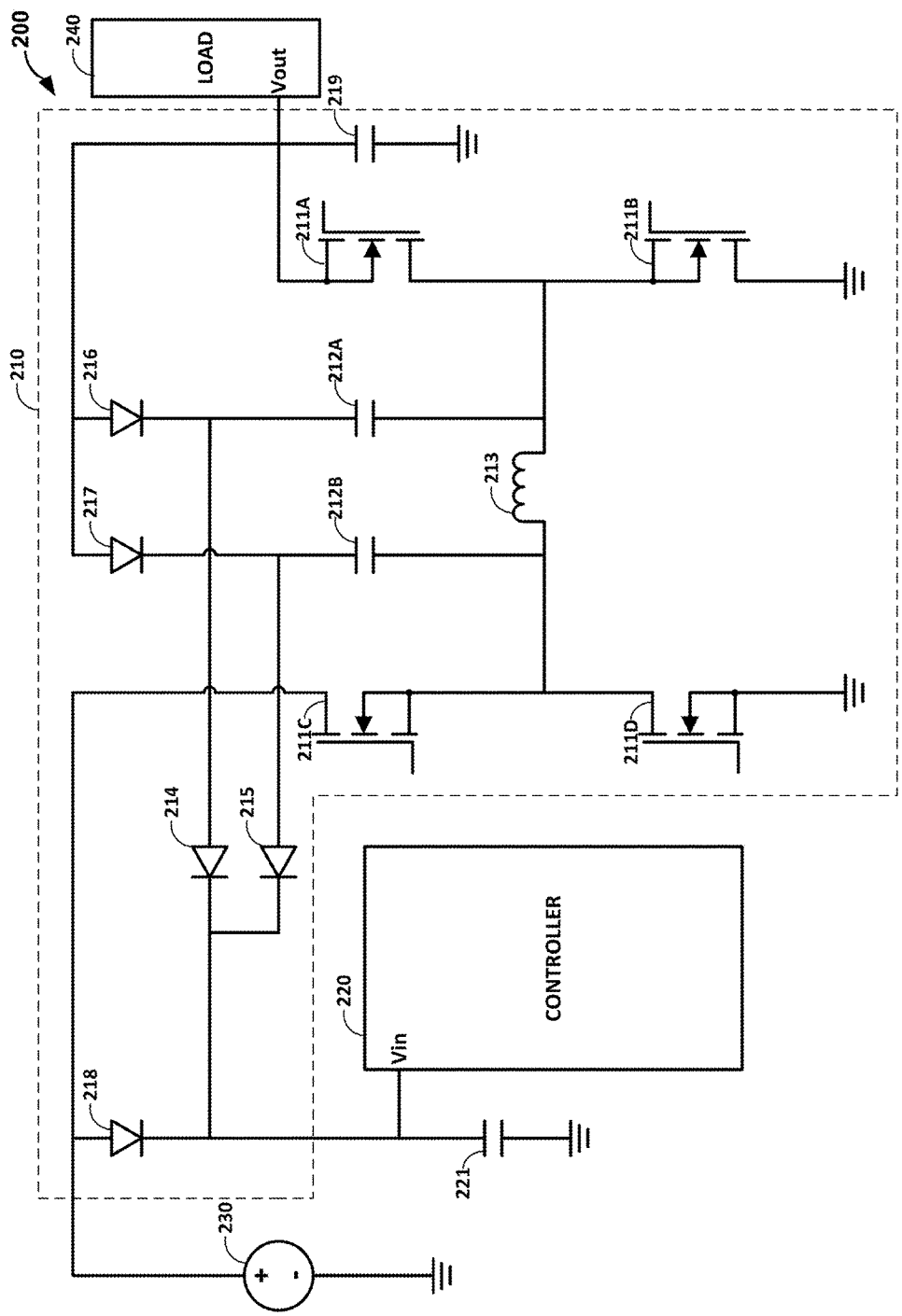
FIG. 2 is a circuit diagram of an input protection system, in accordance with a first embodiment.

FIG. 2 is a circuit diagram of an input protection system 200, in accordance with a first embodiment. As illustrated, input protection system 200 includes circuit 210, which includes transistors 211A, 211B, 211C, and 211D ("transistors 211"), capacitor 212A, capacitor 212B, inductor 213, diodes 214, 215, 216, 217, and 218, and output capacitor 219. Furthermore, input protection system 200 includes controller 220, battery 230, input capacitor 221, and load 240. Circuit 210 may be an example of circuit 110 of FIG. 1. Controller 220 may be an example of controller 120 of FIG. 1. Battery 230 may be an example of battery 130 of FIG. 1. Load 240 may be an example of load 140 of FIG. 1.

Transistors 211 may include power switches such as, but not limited to, any type of field-effect transistor (FET) including (MOSFETs), bipolar junction transistors (BJTs), insulated-gate bipolar transistors (IGBTs), junction field effect transistors (JFETs), or other elements that use voltage for their control. Transistors 211 may include n-type transistors, p-type transistors, and power transistors, or any combination thereof. In some examples, Transistors 211 may include vertical transistors, lateral transistors, and/or horizontal transistors. In some examples, transistors 211 may include other analog devices such as diodes and/or thyristors. In some examples, transistors 211 may operate as switches and/or as analog devices.

Transistors 211 may include various material compounds, such as silicon (Si), silicon carbide (SiC), Gallium Nitride (GaN), or any other combination of one or more semiconductor materials. In some examples, silicon carbide switches may experience lower switching power losses. Improvements in magnetics and faster switching, such as Gallium Nitride switches, may allow transistors 211 to draw short bursts of current from battery 210. These higher frequency switching elements may require control signals to be sent with more precise timing, as compared to lower-frequency switching elements.

A single transistor of transistors 211, such as transistor 211A, may include three terminals: two load terminals and a control terminal. For MOSFET switches, transistor 211A may include a drain terminal, a source terminal, and at least one gate terminal, where the control terminal is a gate terminal. For BJT switches, the control terminal may include a base terminal. Current may flow between the two load terminals of transistor 211A, based on the voltage at the control terminal. Therefore, electrical current may flow across transistor 211A based on control signals delivered to the control terminal of transistor 211A by controller 120. In one example, a voltage value of 10V must be applied to the control terminal of transistor 211A in order to turn transistor 211A 'on,' allowing transistor 211A to draw a current from battery 210 and conduct electricity. In other examples, other voltage values may activate transistor 211A. Furthermore, transistor 211A may be turned 'off' when the voltage applied to the control terminal of transistor 211A is decreased. The resistance of transistor 211A and the voltage across transistor 211A may be increased when transistor 211A is turned off. In this disclosure, "activating" a transistor may mean "turning on" a transistor, and "deactivating" a transistor may mean "turning off" a transistor.

In the example illustrated in FIG. 2, controller 220 is configured to control transistors 211 of circuit 210 in order to regulate the input voltage and input current delivered to controller 220 by circuit 210. Furthermore, controller 220 may alternate circuit 210 between one or more operation modes, the one or more operation modes including but not limited to a buck mode and a boost mode. For example, controller 220 may deliver control signals to the control terminals of transistors 211 to regulate the flow of electricity between the load terminals of the transistors. The control signals may apply voltage to the control terminals of transistors 211, thus activating transistors 211. Controller 220 may regulate the amount of time that transistors 211 are activated. For instance, controller 220 may activate a transistor, such as transistor 211A, at a first time and deactivate transistor 211A at a second time. Controller 220 may control the amount of time separating the first time and the second time. Controller 220 may deliver precise signals to the control terminal of the transistor, accurately regulating the amount of time that transistor 211A is activated.

In one example, circuit 210 functions in the buck mode. Controller 220 activates transistor 211C, causing a current to pass from battery 230 to load 240 via transistor 211C and inductor 213. Transistor 211D, acting as a diode, blocks current from flowing to ground from battery 230 while transistor 211C is on. Moreover, as current travels through inductor 213, a magnetic field is induced in inductor 213. Subsequently, controller 220 deactivates transistor 211C, disconnecting battery 230 from load 240, and inductor 213 releases an excess current charging capacitor 212B, thus decreasing a magnitude of an output voltage delivered to load 240. The excess current passes through diode 217 before reaching capacitor 212B. Capacitor 212B, acting as a charge pump, depolarizes after controller 220 activates transistor 211C, increasing a magnitude of the input voltage delivered to controller 220. In this example, circuit 210 increases the magnitude of the input voltage delivered to controller 220 while circuit 210 decreases the magnitude of the output voltage delivered to load 240. Controller 220 may activate and deactivate transistor 211C for a plurality of switching cycles, each switching cycle of the plurality of switching cycles defining a window of time beginning with the activation of transistor 211C and ending with the reactivation of transistor 211C after controller 220 deactivates transistor 211C.

While circuit 210 is functioning in buck mode, transistor 211A is permanently on, and transistor 211B is permanently off. Transistor 211D acts as a diode defining an anode coupled to ground and a cathode coupled to inductor 213. However, when controller 220 changes the mode of circuit 210, the on/off state of transistors 211 may change from states permanently set while circuit 210 is in buck mode.

In another example, circuit 210 increases the magnitude of the input voltage delivered to controller 220 while circuit 210 is operating in boost mode. In this example, controller 220 turns transistor 211B on, drawing a current from battery 230 to ground through inductor 213. While the current is flowing from battery 230 to ground, a magnetic field is induced in inductor 213, and capacitor 212A is charged by the output voltage of circuit 210. Subsequently, controller 220 deactivates transistor 211B, causing the combined voltage of battery 230 and inductor 213 to increase the magnitude of the voltage delivered to load 240, and causing capacitor 212A to depolarize, increasing the magnitude of the input voltage to controller 220. Controller 220 may activate and deactivate transistor 211B for a plurality of switching cycles, each switching cycle of the plurality of switching cycles defining a window of time beginning with the activation of transistor 211B and ending with the reactivation of transistor 211B after controller 220 deactivates transistor 211B.

While circuit 210 is operating in boost mode, transistor 211C is permanently on and transistor 211D is permanently off. Transistor 211A acts as a diode defining an anode coupled to inductor 213 and a cathode coupled to load 240. However, when controller 220 changes the mode of circuit 210, the on/off state of transistors 211 may change from states permanently set while circuit 210 is in boost mode.

In another example, circuit 210 functions in a start-up mode, the start-up mode allowing battery 230 to directly supply the input voltage to controller 220 via diode 218. If the magnitude of the battery voltage delivered by battery 230 is below the threshold input voltage to power controller 220, charge pumps of circuit 210 are configured to increase the magnitude of the input voltage delivered to controller 220. However, in some examples, such as examples in which the battery voltage is above the threshold input voltage, circuit 210 may function in start-up mode.

Capacitors 212 may be components of charge pumps of circuit 210. Capacitors 212 are circuit elements configured to store electric potential energy. In one example, capacitors 212A and 212B each include two electrical conductors separated by a dielectric medium. When capacitors 212 are charged, positive charge accumulates on one electrical conductor and negative charge accumulates on the other electrical conductor. As capacitors 212 discharge, capacitors 212 are configured to release a direct current similar to the direct current released by battery 230. Furthermore, as capacitors 212 discharge, the voltage across capacitors 212 dissipates, and the magnitude of the input voltage to controller 220 increases.

Inductor 213 is a component of circuit 210 according to the example illustrated in FIG. 2. Inductors are electrical circuit components that resist change in the amount of current passing through the inductor. In some examples, inductors include an electrically conductive wire wrapped in a coil. As current passes through the coil, a magnetic field is created in the coil, and the magnetic field induces a voltage across the inductor. An inductor defines an inductance value, and the inductance value is the ratio of the voltage across the inductor to the rate of change of current passing through the inductor. Therefore, when inductor 213 is charged with a magnetic field and placed in series with battery 230 and load 240, the voltage across inductor 213 is configured to boost the magnitude of the output voltage delivered to load 240. Inductor 213 is also configured to buck the magnitude of the output voltage delivered to load 240 when transistor 211C is turned off, isolating load 240 from battery 230 and decreasing the output voltage to load 240 to the voltage across inductor 213 charged with a magnetic field.

In the example illustrated in FIG. 2, diodes 214, 215, 216, 217, and 218 define semiconductor devices. In the field of circuit electronics, diodes include semiconductor components which allow current to flow across the diode in a first direction (e.g., "forward direction") and prevent current from flowing across the diode in a second direction (e.g., "reverse direction"). A diode may include an anode and a cathode, and current may be able to pass through the diode in the forward direction from the anode to the cathode. However, current may be unable to pass through the diode in the reverse direction from the cathode to the anode.

Diode 214 may allow capacitor 212A to increase the magnitude of the input voltage to controller 220 and allow current to flow from capacitor 212A to controller 220 via diode 214. However, diode 214 may prevent battery 230 from charging capacitor 212A. Diode 215, which is placed in series with controller 220 and capacitor 212B, may allow capacitor 212B to increase the magnitude of the input voltage to capacitor 220. Diode 215 may prevent battery 230 from charging capacitor 212B.

The forward direction of diode 216 is aligned such that current may flow from the output of circuit 210 to capacitor 212A, allowing capacitor 212A to charge via diode 216. However, diode 216 prevents a current emitted by capacitor 212A from reaching load 140, since the reverse direction of diode 216 is arranged such that a cathode of diode 216 is coupled to capacitor 212A. Diode 217 may prevent a current emitted by capacitor 212B from reaching load 240 but allow capacitor 212B to be charged by the output voltage.

Diode 218 is configured to allow current to flow from a positive terminal of battery 230 to controller 220. Hence, the battery voltage output of battery 230 may be applied to power controller 220. However, if the battery voltage is below the threshold input voltage to power controller 220, capacitors 212 may increase the input voltage to controller 220 via diodes 214 and 215. Furthermore, diode 218 is configured to prevent current emitted from discharging capacitors 212 flowing to battery 230, thus directing power from capacitors 212 to controller 220.

Output capacitor 219 may be configured to supply energy to load 240. In one example, output capacitor 219 supplies voltage to load 240. Furthermore, input capacitor 221 may be configured to supply energy to controller 220. In one example, input capacitor 221 supplies voltage to load 240.

Figure 3:
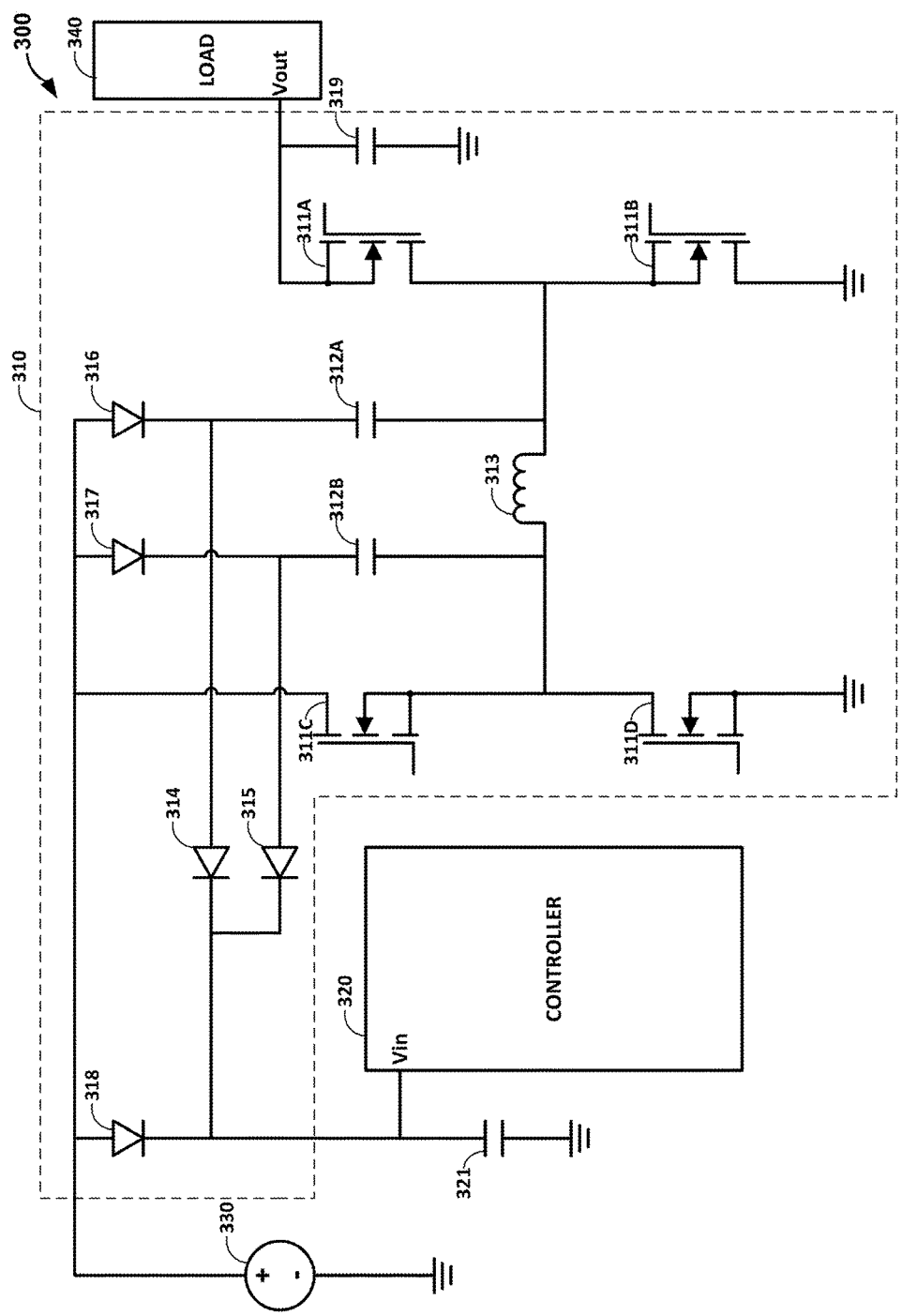
FIG. 3 is a circuit diagram of an input protection system, in accordance with a second embodiment.

FIG. 3 is a circuit diagram of an input protection system 300, in accordance with a second embodiment. As illustrated, input protection system 300 includes circuit 310, which includes transistors 311A, 311B, 311C, and 311D ("transistors 311"), capacitor 312A, capacitor 312B, inductor 313, diodes 314, 315, 316, 317, and 318, and output capacitor 319. Furthermore, input protection system 300 includes controller 320, battery 330, input capacitor 321, and load 340. Circuit 310 may be an example of circuit 110 of FIG. 1. Controller 320 may be an example of controller 120 of FIG. 1. Battery 330 may be an example of battery 130 of FIG. 1. Load 340 may be an example of load 140 of FIG. 1.

Transistors 311 may include power switches such as, but not limited to, any type of field-effect transistor (FET) including (MOSFETs), bipolar junction transistors (BJTs), insulated-gate bipolar transistors (IGBTs), junction field effect transistors (JFETs), or other elements that use voltage for their control. Transistors 311 may include n-type transistors, p-type transistors, and power transistors, or any combination thereof. In some examples, Transistors 311 may include vertical transistors, lateral transistors, and/or horizontal transistors. In some examples, transistors 311 may include other analog devices such as diodes and/or thyristors. In some examples, transistors 311 may operate as switches and/or as analog devices.

Transistors 311 may include various material compounds, such as silicon (Si), silicon carbide (SiC), Gallium Nitride (GaN), or any other combination of one or more semiconductor materials. In some examples, silicon carbide switches may experience lower switching power losses. Improvements in magnetics and faster switching, such as Gallium Nitride switches, may allow transistors 311 to draw short bursts of current from battery 310. These higher frequency switching elements may require control signals to be sent with more precise timing, as compared to lower-frequency switching elements.

In one example, an individual transistor of transistors 311 may be an example of an individual transistor of transistors 211 of FIG. 2. For instance, transistor 311A may be an example of transistor 211A, transistor 311B may be an example of transistor 211B, transistor 311C may be an example of transistor 211C, and transistor 311D may be an example of transistor 211D. Therefore, in one example, a voltage is applied to a control terminal of transistor 311A to turn transistor 311A 'on,' allowing transistor 311A to draw a current from battery 310 and conduct electricity. In other examples, other voltage values may activate transistor 311A. Furthermore, transistor 311A may be turned 'off' when the voltage applied to the control terminal of transistor 311A is decreased. The resistance of transistor 311A and the voltage across transistor 311A may be increased when transistor 311A is turned off.

Controller 320 may be configured to control transistors 311 of circuit 310 to regulate the input voltage and input current delivered to controller 320 by circuit 310. Furthermore, controller 320 may alternate circuit 310 between one or more operation modes, the one or more operation modes including but not limited to a buck mode and a boost mode. For example, controller 320 may deliver control signals to the control terminals of transistors 311 to regulate the flow of electricity between the load terminals of the transistors. The control signals may apply voltage to the control terminals of transistors 311, thus activating transistors 311. Controller 320 may regulate the amount of time that transistors 311 are activated. For instance, controller 320 may activate a transistor, such as transistor 311A, at a first time and deactivate transistor 311A at a second time. Controller 320 may control the amount of time separating the first time and the second time. Controller 320 may deliver precise signals to the control terminal of transistor 311A, accurately regulating the amount of time that transistor 311A is activated. The activation state of each of transistors 311A, 311B, 311C, and 311D may determine the operation mode of circuit 310.

In one example, circuit 310 functions in the boost mode. Controller 320 activates transistor 311B, and battery 330 emits a current, the current travelling to ground through inductor 313. As the current passes through inductor 313, a magnetic field is induced in inductor 313. Furthermore, after controller 320 activates transistor 311B, battery 330 charges capacitor 312A. Subsequently, controller 320 deactivates transistor 311B, and current flows from battery 330 to load 340 via inductor 313. While transistor 311B is deactivated, battery 330, inductor 313, and load 340 are placed in series. Therefore, the combined voltage of battery 330 and inductor 313 are applied to load 340, thus increasing the magnitude of the output voltage delivered to load 340 by circuit 310 from the battery voltage supplied to circuit 310. Additionally, while circuit 310 is functioning in boost mode, a magnitude of a current delivered to load 340 is decreased from a magnitude of a current supplied to circuit 310 by battery 330. After controller 320 deactivates transistor 311B, capacitor 312A discharges, emitting an input current to controller 320. Discharging capacitor 312A increases the magnitude of the input voltage to controller 320. Controller 320 may activate and deactivate transistor 311B for a plurality of switching cycles, each switching cycle of the plurality of switching cycles defining a window of time beginning with the activation of transistor 311B and ending with the reactivation of transistor 311B after controller 320 deactivates transistor 311B.

While circuit 310 is operating in boost mode, transistor 311C is permanently on and transistor 311D is permanently off. Transistor 311A acts as a diode defining an anode coupled to inductor 313 and a cathode coupled to load 340. However, when controller 320 changes the mode of circuit 310, the on/off state of transistors 311 may change from states permanently set while circuit 310 is in boost mode.

In another example, circuit 310 functions in buck mode. Controller 320 activates transistor 311C and battery 330 emits a current, the current travelling to load 340 through inductor 313. As the current passes through inductor 313, a magnetic field is induced in inductor 313. Subsequently, controller 320 deactivates transistor 311C, and current flows from ground to load 340 via inductor 313. While transistor 311C is deactivated, battery 330 is disconnected from load 340, thus decreasing the magnitude of the output voltage delivered to battery 340 from the magnitude of the battery voltage supplied to circuit 310 by battery 330. Additionally, while circuit 310 is functioning in buck mode, a magnitude of a current delivered to load 340 is increased from a magnitude of a current supplied to circuit 310 by battery 330. Furthermore, after controller 320 deactivates transistor 311C, battery 330 charges capacitor 312B. When controller 230 activates transistor 311C, capacitor 312B discharges, increasing the magnitude of the input voltage supplied to controller 320, and delivering an input current to controller 320. Controller 320 may activate and deactivate transistor 311C for a plurality of switching cycles, each switching cycle of the plurality of switching cycles defining a window of time beginning with the activation of transistor 311C and ending with the reactivation of transistor 311C after controller 320 deactivates transistor 311C.

While circuit 310 is functioning in buck mode, transistor 311A is permanently on, and transistor 311B is permanently off. Transistor 311D acts as a diode defining an anode coupled to ground and a cathode coupled to inductor 313. However, when controller 320 changes the mode of circuit 310, the on/off state of transistors 311 may change from states permanently set while circuit 310 is in buck mode.

In another example, circuit 310 functions in a start-up mode, the start-up mode allowing battery 330 to directly supply the input voltage to controller 320 via diode 318. If the magnitude of the battery voltage delivered by battery 330 is below the threshold input voltage to power controller 320, charge pumps of circuit 310 are configured to increase the magnitude of the input voltage delivered to controller 320. However, in some examples, such as examples in which the battery voltage is above the threshold input voltage, circuit 310 may function in start-up mode.

In the example illustrated in FIG. 3, diodes 314, 315, 316, 317, and 318 define semiconductor devices. Diode 314 may allow capacitor 312A to increase the magnitude of the input voltage to controller 320 and allow current to flow from capacitor 312A to controller 320 via diode 314. Diode 315, which is placed in series with controller 320 and capacitor 312B, may allow capacitor 312B to increase the magnitude of the input voltage to capacitor 320. The forward direction of Diode 316 is aligned such that current may flow from battery 330 to capacitor 312A, allowing capacitor 312A to charge via diode 316. However, diode 316 prevents a current emitted by capacitor 312A from reaching battery 330, since the reverse direction of diode 316 is arranged such that a cathode of diode 316 is coupled to capacitor 312A. Diode 317 may prevent a current emitted by capacitor 312B from reaching battery 330 but allow battery 330 to charge capacitor 312B.

Diode 318 is configured to allow current to flow from a positive terminal of battery 330 to controller 320. Hence, the battery voltage output of battery 330 may be applied to controller 320. However, if the battery voltage is below the threshold input voltage to power controller 320, capacitors 312 may increase the input voltage to controller 320 via diodes 314 and 315. Furthermore, diode 318 is configured to prevent current emitted by discharging capacitors 312 from flowing to battery 330, thus directing power from capacitors 312 to controller 320.

Output capacitor 319 may be configured to supply energy to load 340. In one example, output capacitor 319 supplies voltage to load 340. Furthermore, input capacitor 321 may be configured to supply energy to controller 320. In one example, input capacitor 321 supplies voltage to load 340.

Figure 4:
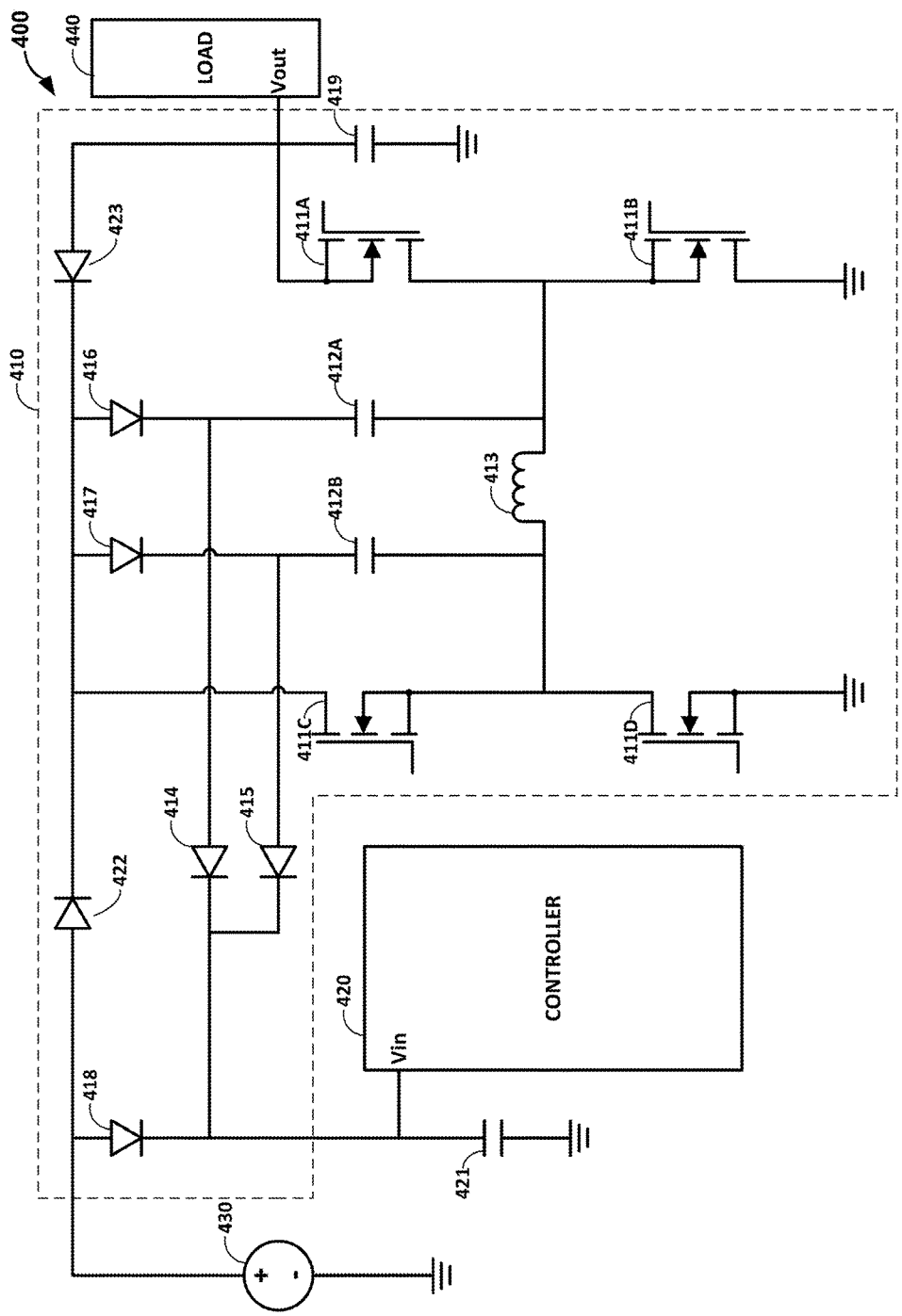
FIG. 4 is a circuit diagram of an input protection system, in accordance with a third embodiment.

FIG. 4 is a circuit diagram of an input protection system 400, in accordance with a third embodiment. As illustrated, input protection system 400 includes circuit 410, which includes transistors 411A, 411B, 411C, and 411D ("transistors 411"), capacitors 412A and 412B ("capacitors 412"), inductor 413, diodes 414, 415, 416, 417, 418, 422, and 423, and output capacitor 419. Furthermore, input protection system 400 includes controller 420, battery 430, input capacitor 421, and load 440. Circuit 410 may be an example of circuit 110 of FIG. 1. Controller 420 may be an example of controller 120 of FIG. 1. Battery 430 may be an example of battery 130 of FIG. 1. Load 440 may be an example of load 140 of FIG. 1.

The example system 400 illustrated in FIG. 4 may perform any of the methods and techniques described with respect to system 200 illustrated in FIG. 2 and system 300 illustrated in FIG. 3. Furthermore, system 400 includes two additional diodes (diodes 422 and 423) that are not present in systems 200 and 300. Diode 422 may allow battery 430 to charge capacitors 412, but diode 423 may prevent battery 430 from directly supplying voltage to load 440 via diode 422. Diode 423 may allow the output voltage delivered to load 440 to charge capacitors 412. However, diode 422 may prevent the output voltage delivered to load 440 from applying a voltage to battery 430.

Figure 5:
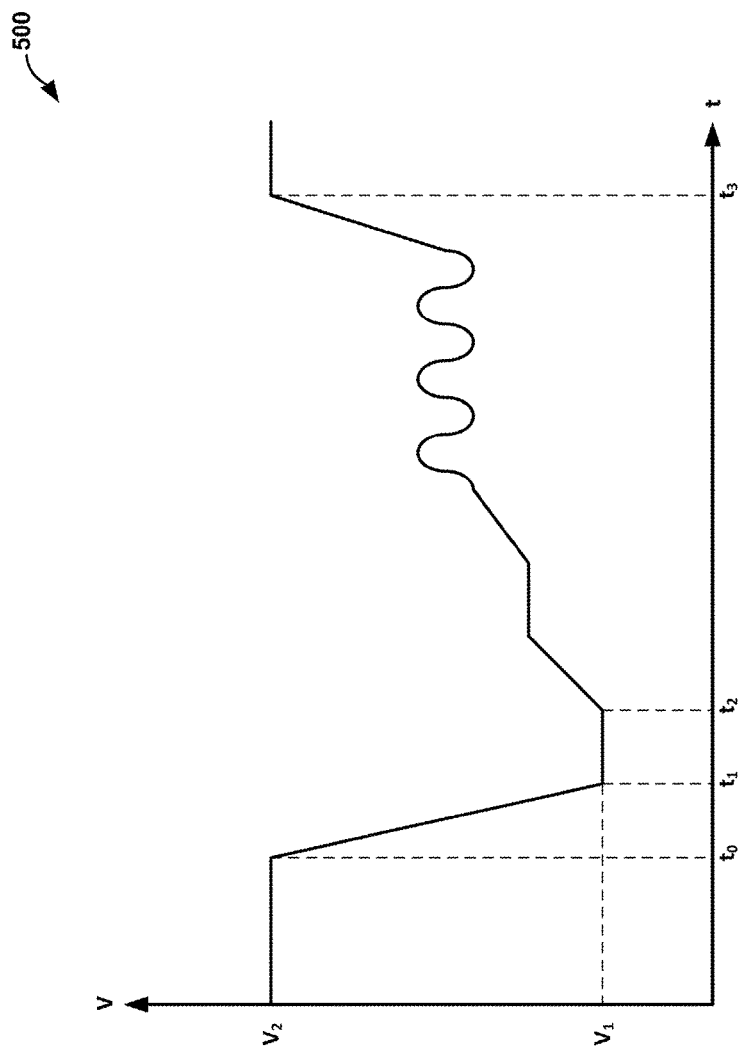
FIG. 5 is a graph illustrating the relationship between battery voltage and time, in accordance with some examples of this disclosure.

FIG. 5 is a graph 500 illustrating the relationship between battery voltage and time, in accordance with some examples of this disclosure. For purposes of illustration only, FIG. 5 is described below within the context of system 100 of FIG. 1. However, the techniques described below can be used in any permutation, and in any combination, with circuit 110, controller 120, battery 130, and load 140.

In the example illustrated in FIG. 5, $V_2$ represents the steady-state battery voltage provided to circuit 110 by battery 130. In one example, battery 130 is an automotive battery providing a steady-state battery voltage of 12 Volts, and a temperature of battery 130 is below 0° Celsius. Battery 130 powers the starter motor at time t0, and in response, battery voltage drops to minimum voltage value $V_1$ over a window of time extending from $t_0$ to $t_1$, the window of time lasting less than 1 millisecond. Subsequently, battery voltage remains at minimum voltage value $V_1$ for 19 milliseconds from time $t_1$ to time $t_2$. Battery voltage returns to steady-state $V_2$ during a window of time extending from $t_2$ to $t_3$, the window of time lasting approximately 10.5 seconds. Minimum battery voltage $V_1$ is 3.2 Volts, which is below a threshold voltage of 4.5 Volts to power controller 120. Controller 110 is configured to supplement minimum battery voltage $V_1$ during the window of time extending from $t_1$ to $t_2$, increasing the input voltage to controller 120 using one or more charge pumps.

Figure 6:
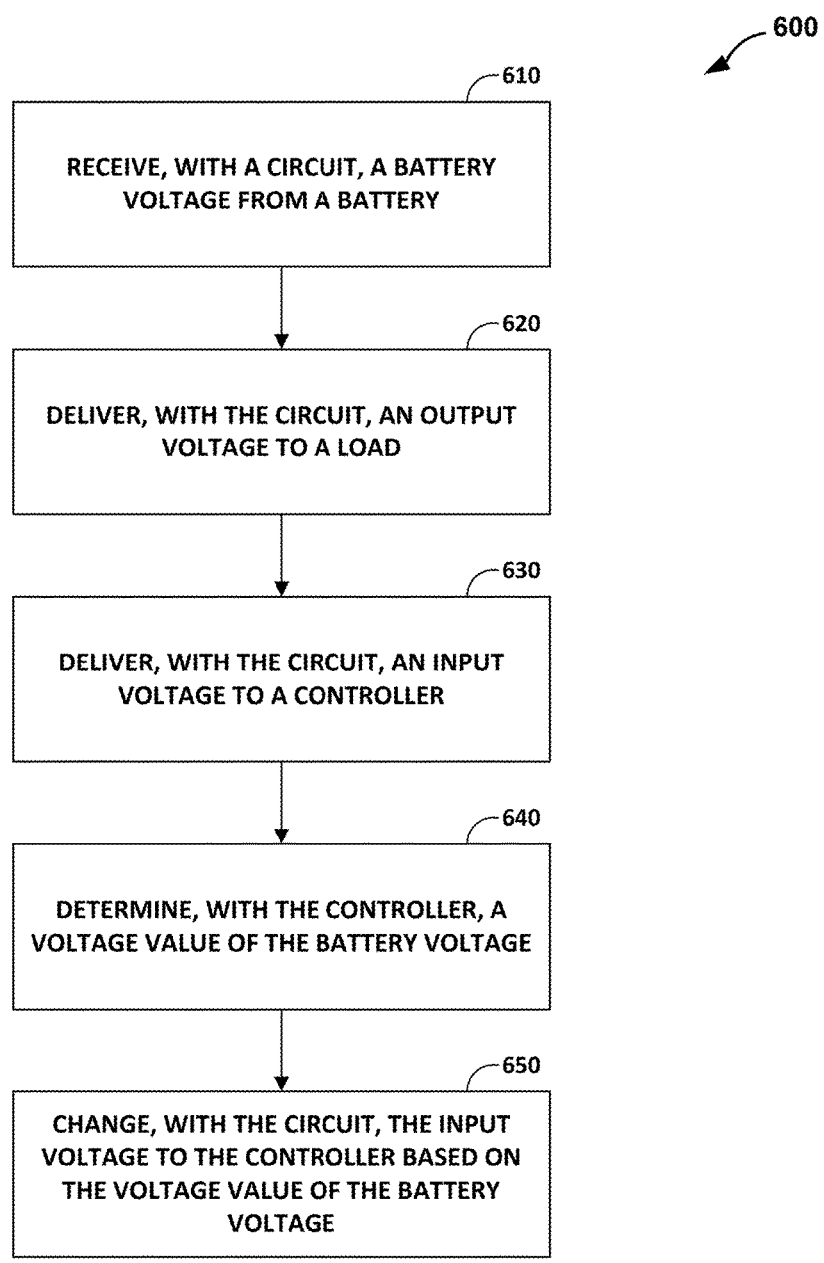
FIG. 6 is a flow diagram consistent with techniques that may be performed by the system of FIG. 1, in accordance with this disclosure.

FIG. 6 is a flow diagram 600 consistent with techniques that may be performed by the system of FIG. 1, in accordance with this disclosure. For purposes of illustration only, FIG. 6 is described below within the context of system 100 of FIG. 1. However, the techniques described below can be used in any permutation, and in any combination, with circuit 110, controller 120, battery 130, and load 140.

In accordance with one or more techniques of this disclosure, circuit 110 may receive a battery voltage from battery 130 (610). Additionally, circuit 110 may deliver an output voltage to load 140 (620) and deliver an input voltage to controller 120. Controller 120 may determine a voltage value of the battery voltage (640). Subsequently, circuit 110 may change the input voltage to controller 120 based on the voltage value of the battery voltage (650).

The following examples may illustrate one or more aspects of the disclosure.

Example 1

A circuit includes one or more switches, wherein the circuit is configured to receive a battery voltage from a battery, deliver an input voltage to a controller, deliver an output voltage, and receive signals from the controller, wherein the signals activate the one or more switches and deactivate the one or more switches, and wherein activating the one or more switches and deactivating the one or more switches controls the input voltage to the controller.

Example 2

The circuit of example 1, wherein the one or more switches include a transistor, and wherein the controller is configured to control a gate terminal of the transistor, the circuit including a capacitor configured to be charged by a current after the transistor turns on, the current being driven by an output voltage and an inductor configured to increase the output voltage after the transistor turns off, wherein the capacitor is configured increase a magnitude of the input voltage to the controller after the transistor turns off.

Example 3

The circuit of example 1 or 2, wherein the one or more switches include a transistor, and wherein the controller is configured to control a gate terminal of the transistor, the circuit including a capacitor and an inductor configured to charge the capacitor after the transistor turns off, wherein the capacitor is configured to increase a magnitude of the input voltage to the controller after the transistor turns on.

Example 4

The circuit of any of examples 1-3 or combinations thereof, wherein the one or more switches include a transistor, and wherein the controller is configured to control a gate terminal of the transistor, the circuit including a capacitor configured to charge after the transistor turns on, the capacitor being charged by a current emitted by the battery and an inductor configured to emit an excess current to an output of the circuit after the transistor turns off, wherein the capacitor is configured to increase a magnitude of the input voltage to the controller after the transistor turns off.

Example 5

The circuit of any of examples 1-4 or combinations thereof, wherein the one or more switches include a transistor, and wherein the controller is configured to control a gate terminal of the transistor, the circuit including a capacitor configured to charge after the transistor turns off, the capacitor being charged by a current emitted by the battery and an inductor configured to emit an excess current to an output of the circuit after the transistor turns off, wherein the capacitor is configured to increase a magnitude of the input voltage to the controller after the transistor turns on.

Example 6

The circuit of any of examples 1-5 or combinations thereof, wherein the one or more switches includes a plurality of transistors, the circuit including a first transistor, a second transistor, a third transistor, and a fourth transistor. The circuit further includes a first capacitor configured to be charged by a current after the first transistor turns on, the current being driven by an output voltage, wherein the third transistor is on and the fourth transistor is off, a second capacitor, and an inductor configured to increase the output voltage after the first transistor turns off, wherein the third transistor is on and the fourth transistor is off, and charge the second capacitor after the third transistor turns off, wherein the second transistor is on and the first transistor is off, wherein the first capacitor is configured increase a magnitude of the input voltage to the controller after the first transistor turns off while the third transistor is on and the fourth transistor is off, and wherein the second capacitor is configured to increase the magnitude of the input voltage to the controller after the third transistor turns on while the second transistor is on and the first transistor is off.

Example 7

The circuit of any of examples 1-6 or combinations thereof, wherein each switch of the one or more switches includes a metal-oxide-semiconductor field-effect transistor (MOSFET), a bipolar junction transistor (BJT), an insulated gate bipolar transistor (IGBT), or a junction field effect transistor (JFET).

Example 8

The circuit of any of examples 1-7 or combinations thereof, wherein the circuit is configured to increase a magnitude of the input voltage to the controller if the battery voltage is below a voltage threshold.

Example 9

The circuit of any of examples 1-8 or combinations thereof, wherein the voltage threshold is approximately 4.5 Volts.

Example 10

The circuit of any of examples 1-9 or combinations thereof, wherein the circuit is configured to increase the magnitude of the input voltage to the controller if the battery voltage is above approximately 2 Volts.

Example 11

A system includes a circuit. The circuit includes one or more switches and a battery configured to deliver a battery voltage to power the circuit. The circuit further includes a load configured to be powered by an output voltage delivered by the circuit and a controller configured to produce signals activating the one or more switches and deactivating the one or more switches, wherein the circuit is configured to provide an input voltage to the controller, and wherein activating the one or more switches and deactivating the one or more switches controls the input voltage to the controller.

Example 12

The system of example 11, wherein the one or more switches include a transistor, and wherein the controller is configured to control a gate terminal of the transistor, the circuit further including a capacitor configured to be charged by a current after the transistor turns on, the current being driven by an output voltage and an inductor configured to increase the output voltage to the load after the transistor turns off, and deliver an excess current to the load after the transistor turns off, wherein the capacitor is configured increase a magnitude of the input voltage to the controller after the transistor turns off.

Example 13

The system of examples 11 or 12, wherein the one or more switches include a transistor, and wherein the controller is configured to control a gate terminal of the transistor, the circuit further including a capacitor and an inductor configured to charge the capacitor after the transistor turns off and deliver an excess current to the load after the transistor turns off, wherein the capacitor is configured to increase a magnitude of the input voltage to the controller after the transistor turns on.

Example 14

The system of any of examples 11-13 or combinations thereof, wherein the one or more switches include a transistor, and wherein the controller is configured to control a gate terminal of the transistor, the circuit further including a capacitor configured to charge after the transistor turns on, the capacitor being charged by a current emitted by the battery and an inductor configured to deliver an excess current to the load after the transistor turns off, wherein the capacitor is configured to increase a magnitude of the input voltage to the controller after the transistor turns off.

Example 15

The system of any of examples 11-14 or combinations thereof, wherein the one or more switches include a transistor, and wherein the controller is configured to control a gate terminal of the transistor, the circuit further including a capacitor configured to charge after the transistor turns off, the capacitor being charged by a current emitted by the battery and an inductor configured to deliver an excess current to the load after the transistor turns off, wherein the capacitor is configured to increase a magnitude of the input voltage to the controller after the transistor turns on.

Example 16

The circuit of any of examples 11-15 or combinations thereof, wherein the battery is further configured to power a starter motor, the starter motor configured to rotate an internal combustion engine.

Example 17

The circuit of any of examples 11-16 or combinations thereof, wherein in response to the battery powering the starter motor, the battery voltage delivered to the circuit is decreased.

Example 18

The circuit of any of examples 11-17 or combinations thereof, wherein the controller is further configured to control at least one light-emitting diode (LED), wherein controlling the at least one LED includes regulating current and voltage delivered to the at least one LED.

Example 19

A method including receiving, by a circuit including one or more switches, a battery voltage from a battery, delivering, by the circuit, an output voltage to a load, delivering, by the circuit, an input voltage to a controller configured to activate the one or more switches and deactivate the one or more switches, determining, by the controller, a voltage value of the battery voltage, and changing, with the circuit, the input voltage to the controller based on the voltage value of the battery voltage.

Example 20

The method of example 19, wherein changing the input voltage to the controller includes increasing, with the circuit, a magnitude of the input voltage to the controller in response to determining that the voltage value of the battery voltage is below a threshold voltage.

Various examples of the disclosure have been described. In particular, an input protection circuit has been described that helps to control input to a controller. Although described for use in an automobile to help ensure operation of a starter motor, the circuit may find use in other types of vehicles or other applications. Indeed, the circuit may be useful in any of a wide range of applications where voltage control of a load and separate voltage control to a microcontroller is desired. Any combination of the described systems, operations, or functions is contemplated. These and other examples are within the scope of the following claims.

What is claimed is:
1. A circuit comprising one or more switches, wherein the circuit is configured to:
receive a battery voltage from a battery;
deliver an input voltage to a controller, wherein the input voltage is configured to provide power to circuitry of the controller;
deliver an output voltage; and
receive signals from the controller, wherein the signals activate the one or more switches and deactivate the one or more switches, and wherein activating the one or more switches and deactivating the one or more switches increases a magnitude of the input voltage to the controller if the battery voltage is below a voltage threshold.

2. The circuit of claim 1, wherein the one or more switches comprise a transistor, and wherein the controller is configured to control a gate terminal of the transistor, the circuit comprising:
   a capacitor configured to be charged by a current after the transistor turns on, the current being driven by an output voltage; and
   an inductor configured to increase the output voltage after the transistor turns off,
   wherein the capacitor is configured to increase the magnitude of the input voltage to the controller after the transistor turns off.

3. The circuit of claim 1, wherein the one or more switches comprise a transistor, and wherein the controller is configured to control a gate terminal of the transistor, the circuit comprising:
   a capacitor; and
   an inductor configured to charge the capacitor after the transistor turns off,
   wherein the capacitor is configured to increase the magnitude of the input voltage to the controller after the transistor turns on.

4. The circuit of claim 1, wherein the one or more switches comprise a transistor, and wherein the controller is configured to control a gate terminal of the transistor, the circuit comprising:
   a capacitor configured to charge after the transistor turns on, the capacitor being charged by a current emitted by the battery; and
   an inductor configured to emit an excess current to an output of the circuit after the transistor turns off,
   wherein the capacitor is configured to increase the magnitude of the input voltage to the controller after the transistor turns off.

5. The circuit of claim 1, wherein the one or more switches comprise a transistor, and wherein the controller is configured to control a gate terminal of the transistor, the circuit comprising:
   a capacitor configured to charge after the transistor turns off, the capacitor being charged by a current emitted by the battery; and
   an inductor configured to emit an excess current to an output of the circuit after the transistor turns off,
   wherein the capacitor is configured to increase the magnitude of the input voltage to the controller after the transistor turns on.

6. The circuit of claim 1, wherein the one or more switches comprises a plurality of transistors, the circuit comprising:
   a first transistor;
   a second transistor;
   a third transistor;
   a fourth transistor;
   a first capacitor configured to be charged by a current after the first transistor turns on, the current being driven by an output voltage, wherein the third transistor is on and the fourth transistor is off;
   a second capacitor; and
   an inductor configured to:
      increase the output voltage after the first transistor turns off, wherein the third transistor is on and the fourth transistor is off, and
      charge the second capacitor after the third transistor turns off, wherein the second transistor is on and the first transistor is off,
   wherein the first capacitor is configured to increase the magnitude of the input voltage to the controller after the first transistor turns off while the third transistor is on and the fourth transistor is off, and
   wherein the second capacitor is configured to increase the magnitude of the input voltage to the controller after the third transistor turns on while the second transistor is on and the first transistor is off.

7. The circuit of claim 1, wherein each switch of the one or more switches comprises a metal-oxide-semiconductor field-effect transistor (MOSFET), a bipolar junction transistor (BJT), an insulated gate bipolar transistor (IGBT), or a junction field effect transistor (JFET).

8. The circuit of claim 1, wherein the voltage threshold is approximately 4.5 Volts.

9. The circuit of claim 1, wherein the circuit is configured to increase the magnitude of the input voltage to the controller if the battery voltage is above approximately 2 Volts.

10. The circuit of claim 1, wherein a magnitude of the battery voltage received by the circuit decreases below the voltage threshold in response to delivering the output voltage.

11. A system comprising:
    a circuit comprising one or more switches;
    a battery configured to deliver a battery voltage to power the circuit;
    a load configured to be powered by an output voltage delivered by the circuit; and
    a controller configured to produce signals activating the one or more switches and deactivating the one or more switches, wherein the circuit is configured to provide an input voltage to the controller, and wherein the input voltage is configured to provide power to circuitry of the controller, and
    wherein activating the one or more switches and deactivating the one or more switches increases a magnitude of the input voltage to the controller if the battery voltage is below a voltage threshold.

12. The system of claim 11, wherein the one or more switches comprise a transistor, and wherein the controller is configured to control a gate terminal of the transistor, the circuit further comprising:
    a capacitor configured to be charged by a current after the transistor turns on, the current being driven by an output voltage; and
    an inductor configured to:
       increase the output voltage to the load after the transistor turns off, and
       deliver an excess current to the load after the transistor turns off,
    wherein the capacitor is configured to increase the magnitude of the input voltage to the controller after the transistor turns off.

13. The system of claim 11, wherein the one or more switches comprise a transistor, and wherein the controller is configured to control a gate terminal of the transistor, the circuit further comprising:
    a capacitor; and
    an inductor configured to:
       charge the capacitor after the transistor turns off, and deliver an excess current to the load after the transistor turns off,
wherein the capacitor is configured to increase the magnitude of the input voltage to the controller after the transistor turns on.

14. The system of claim 11, wherein the one or more switches comprise a transistor, and wherein the controller is configured to control a gate terminal of the transistor, the circuit further comprising:
 a capacitor configured to charge after the transistor turns on, the capacitor being charged by a current emitted by the battery; and
 an inductor configured to deliver an excess current to the load after the transistor turns off,
 wherein the capacitor is configured to increase the magnitude of the input voltage to the controller after the transistor turns off.

15. The system of claim 11, wherein the one or more switches comprise a transistor, and wherein the controller is configured to control a gate terminal of the transistor, the circuit further comprising:
 a capacitor configured to charge after the transistor turns off, the capacitor being charged by a current emitted by the battery; and
 an inductor configured to deliver an excess current to the load after the transistor turns off,
 wherein the capacitor is configured to increase the magnitude of the input voltage to the controller after the transistor turns on.

16. The system of claim 11, wherein the battery is further configured to power a starter motor, the starter motor configured to rotate an internal combustion engine.

17. The system of claim 16, wherein in response to the battery powering the starter motor, the battery voltage delivered to the circuit is decreased.

18. The circuit of claim 11, wherein the controller is further configured to control at least one light-emitting diode (LED), wherein controlling the at least one LED comprises regulating current and voltage delivered to the at least one LED.

19. The system of claim 11, wherein a magnitude of the battery voltage delivered to the circuit decreases below the voltage threshold in response to the circuit delivering the output voltage to the load.

20. A method comprising:
 receiving, by a circuit comprising one or more switches, a battery voltage from a battery;
 delivering, by the circuit, an output voltage to a load;
 delivering, by the circuit, an input voltage to a controller configured to activate the one or more switches and deactivate the one or more switches, wherein the input voltage is configured to provide power to circuitry of the controller;
 determining, by the controller, a voltage value of the battery voltage; and
 increasing, with the circuit, a magnitude of the input voltage to the controller in response to determining that the voltage value of the battery voltage is below a voltage threshold.

* * * * *